United States Patent Office 3,637,599
Patented Jan. 25, 1972

3,637,599
METHOD OF PRODUCING POLYURETHANES
AND SAID PRODUCT
James E. Ditty, North Canton, Ohio, assignor to The
Goodyear Tire & Rubber Company, Akron, Ohio
No Drawing. Continuation of application Ser. No.
827,090, May 12, 1969, which is a continuation of
application Ser. No. 415,817, Dec. 3, 1964. This
application Feb. 16, 1970, Ser. No. 10,083
Int. Cl. C08g 17/00
U.S. Cl. 260—75 NT                                1 Claim

ABSTRACT OF THE DISCLOSURE

This invention relates to a method of preparing reaction mixtures comprising a reactive hydrogen containing polymeric material of about 500 to 6000 molecular weight and a mixture of about 1 to 35 parts of a polyaryl methane polyisocyanate of the formula $$OCN-R-(CY_2-R'-NCO)_n$$

in which —R— and —R'— are arylene radicals, Y is selected from the group consisting of hydrogen, alkyl, and aryl radicals, $n$ is a whole number having values of from about 1 to about 10 with at least a major percentage being the polyisocyanate, where $n$ is at least 2, and the —($CY_2$—R'—NCO) groups in excess of one are attached to the preceding R' radical for each 100 parts of toluidine diisocyanate. This reaction mixture has unusual storage stable characteristics.

This application is a continuation of application Ser. No. 827,090, filed May 12, 1969, now abandoned, which in turn is a continuation of application Ser. No. 415,817, filed Dec. 3, 1964, now abandoned.

This invention relates to a method for producing polyurethanes having improved smear points and to said polyurethanes.

Although polyurethanes are known to have excellent physical properties, one of their deficiencies is their low smear point which indicates the inability of polyurethanes to resist heat build-up and its tendency to fuse or become plastic at temperatures no higher than those experienced by passenger tires when driven at 70 miles per hour.

Consequently, an object of this invention is to provide a method for producing polyurethanes having improved smear points and also to provide a method wherein certain isocyanates and reactive hydrogen-containing materials may be utilized as a storage-stable prepolymer to produce polyurethanes having more desirable physical properties.

This object and others may be accomplished by using about 1 to about 35, and preferably about 5 to 25 parts by weight of a polyaryl methane polyisocyanate with 100 parts of a polyisocyanate selected from the class consisting of toluene diisocyanate, a toluidine diisocyanate, bis (isocyanato phenyl) methane. These mixtures of isocyanates are preferably reacted with a reactive hydrogen containing material to form a prepolymer, although they may be used in the one step process. This prepolymer has the unusual ability of being able to be stored for relatively long periods of time, up to 6 months and in some cases a year without reaching the point where the prepolymer cannot be used to react with a diamine to form a cured polyurethane. These mixed polyisocyanates may be utilized with the usual catalyst systems used for making foam, castings, films, or injestable molding compositions.

The reactive hydrogen containing polymeric materials useful in this invention have molecular weights of about 500 to 6000 and preferably about 1500 to 3500 where the resulting product is to have elastomeric properties. Of the many reactive hydrogen containing polymeric materials the following are representative classes: the polyether polyols, polyester polyols, polyester amides, hydrocarbon polyols, polycarbonate polyols and polyols containing mixtures of the various groups such as a mixed polyether-polyester polyol.

Representative of the many polyether polyols are those commercially available as condensation products of propylene oxide or ethylene oxide with a nucleus generating material such as the monomeric glycols or the polyfunctional materials such as trimethylol propane and glycerine or the polymers of alkylene oxides with tetrahydrofuran. It should be noted that by the suitable choice of a nucleus generating material such as a glycol or a carboxylic acid the resulting polyether may have from 2 to as many as 8 hydroxyls.

Representative polyester polyols are the condensation products of a polycarboxylic acid, either aromatic or aliphatic with a monomeric polyol such as ethylene glycol, propylene glycol, butylene glycol, glycerine, pentaerythritol or trimethyl propane. Instead of the carboxylic acids, their anhydrides may be used.

Representative carboxylic acids are the aliphatic acids containing from 2–10 carbon atoms such as adipic, glutaric, and sebacic and azelaic.

Representative aromatic acids are the phthalic, terephthalic and isophthalic.

The polyester amides are usually made by using an amine or an amino alcohol to condense with the reactions which form the polyesters.

The hydrocarbons polyols are frequently obtained by polymerizing butadiene, isoprene and related dienes with an alkali metal to build up a polymer having a molecular weight of about a thousand to three or four thousand and then terminating the reaction by removing the metal with an alkylene oxide such as propylene or ethylene and hydrolizing away the alkali metal salt.

Likewise, the polycarbonate polyols are made by phosgenating suitable monomeric glycols or polyether glycols to form the bis chloroformate and then reacting the bis chloroformate with an excess of a polyol to give a material having hydroxyl termination.

The reactive hydrogen containing polymeric materials are reacted with the organic polyisocyanates in the ratio of about 1.1 to 12 mols of polyisocyanate for each mol of reactive hydrogen containing polymeric material, with the preferred ratio being about 1.2 to about 2.5 mols of polyisocyanate. Usually a crosslinking agent is added to react with the excess organic polyisocyanate with the ratios being about 1.1 mol to about 1 mol of crosslinker. Where the crosslinker exceeds or is substantially equivalent to the excess organic polyisocyanate it is desirable to utilize a catalyst such as mercaptobenzothiazole or the related mercaptoazoles disclosed in the copending application, Ser. No. 393,779, filed Sept. 1, 1964 now Pat. No. 3,446,779 to prevent the physicals from being inferior to those where about .5 mol of crosslinker is used.

Of the glycol crosslinkers butanediol is preferred and of the organic diamine crosslinkers the chlorinated diamines which do not give a turbidity within about 25 seconds when mixed with about .2 to a half mol of concentration in boiling methylene chloride with the polyisocyanate is preferred. Of these chlorinated diamines methylene bis chloroaniline or ortho dichlorobenzidene are preferred. Of the amino alcohols 2-methyl-2-aminopropanol is especially preferred.

The practice of this invention is further illustrated with respect to the following examples which are to be interpreted as representative rather than restrictive of the scope of this invention and all parts are by weight unless otherwise designated.

EXAMPLE I

A polyester was prepared by reacting a mixture of 80% by weight of ethylene glycol and 20% of propylene glycol with adipic acid to obtain a product having a reactive number of about 58 and an acid number less than 5. This polyester was dried under vacuum for one hour at 130° C. At the end of the drying time 23.5 parts of 4,4'-toluidine diisocyanate, hereinafter called TODI, was added to 100 parts of the dry polyester and the two were allowed to react for one-half hour under vacuum at 130° C. At the end of this time four parts by weight of polyphenyl methane polyisocyanate was added to the prepolymer. Then this prepolymer was placed in a sealed container for storage and after one year of storage the prepolymer containing the polyphenyl methane polyisocyanate was melted and brought to a temperature of 120° C. under vacuum to remove air and then a stoichiometric amount of ortho dichlorobenzidine, hereinafter called ODCB was added to the prepolymer and the resulting mixture was cured at 126° C.

The control prepolymer which contained no polyphenyl methane polyisocyanate on being stored one week was found to be unusable. Thus, by the use of a small amount of polyphenyl methane polyisocyanate it is possible to prepare storage-stable prepolymers with TODI.

EXAMPLE II

The polyester of Example I was evacuated for one hour at 120° C. to remove any moisture and then this polyester was reacted with the diisocyanate shown in Table 1 for 1.5 hours at 120° C. while maintained under a vacuum and under agitation. At the end of thirty minutes a control sample was removed from the reaction vessel and then the amount of polyphenyl methane polyisocyanate indicated in Table I under the abbreviation PPMPI was added to the prepolymer and thoroughly mixed therein before the prepolymer was placed in the container under a blanket of nitrogen and stored in the container. At the end of the storage time the prepolymers were then made into elastomers after being crosslinked with ortho dichlorobenzidine. This was done by heating and degassing the stored prepolymer at 120° C. before adding the melted ODCB. The prepolymer containing the melted ODCB was placed in test molds and placed in an oven for 16 hours at 126° C. at which time the samples were removed from the oven and allowed to cool. The test results shown in Table 2 were determined on these specimens. The controls shown in Table 2 are the physical properties of a sample obtained on the freshly prepared prepolymer which did not contain polyphenyl methane polyisocyanate.

Table 2 discloses the use of PPMPI gives a cured elastomer having an improved smear point as well as improved prepolymer storage life.

A smear point determination was run on the cured sample in accordance with the test procedure described in an article by S. D. Gehman et al. in Rubber Chemistry and Technology, vol. XXVIII, No. 2, April—June 1955. The smear point of the cured material prepared according to Example 1 was 410° F.

TABLE 1

|  | Control |  | Control |  | Control |  |
|---|---|---|---|---|---|---|
| Polyester | 100 | 100 | 100 | 100 | 100 | 100 |
| TODI | 23.2 | 23.2 |  |  |  |  |
| MDI |  |  | 21.6 | 21.6 |  |  |
| TDI |  |  |  |  | 15 | 15 |
| ODCB | 6.6 | 6.6 | 6.6 | 6.6 | 6.6 | 6.6 |
| PPMPI |  | 4 |  | 4 |  | 4 |
| Total | 129.8 | 133.8 | 128.2 | 132.2 | 121.6 | 125.6 |

TABLE 2

|  | TODI | | MDI | | TDI | |
|---|---|---|---|---|---|---|
|  | Control | Stored | Control | Stored | Control | Stored |
| Storage time, months | 0 | 12 | 0 | 6 | 0 | 6 |
| Modulus (p.s.i.): | | | | | | |
| 300% | 1,578 | 2,601 | 742 | 1,000 | 1,012 | 876 |
| 500% | 2,833 |  | 2,534 | 4,288 | 2,988 | 3,618 |
| Ultimate elongation (percent) | 770 | 390 | 630 | 540 | 640 | 580 |
| Tensile strength (p.s.i.) | 5,599 | 4,407 | 6,647 | 5,824 | 5,247 | 5,824 |
| Crescent tear (lbs./in.) | 607 | 476 | 388 | 272 | 430 | 254 |
| Shore A | 83 | 84 | 74 | 69 | 74 | 69 |
| Compression set (percent) | 16 | 22 | 16 | 8.7 | 19 | 8.7 |
| Smear point (° F.) | 431 | 438 | 370 | 442 | 386 | 426 |
| B of S abrasion | 201 | 69 | 117 | 61 | 143 | 31 |

Propylene ether glycol of about 2000 molecular weight, polymethylene bis-oxyethanol of about 3000 molecular weight and hydroxyl terminated poly (ethylene glycol carbonate) of about 1000 molecular weight may be used instead of the polyester in the above examples.

The polyaryl methane polyisocyanate, for instance, the one used in Example II where R and R' are phenylene may be described as corresponding to the formula $$OCN-R-(CY_2-R'-NCO)_n$$

in which R and R' are arylene radicals, Y is selected from the group consisting of hydrogen, alkyl, and aryl radicals, $n$ is a whole number having values of from 1 to about 10, and the $(CY_2-R'-NCO)$ groups in excess of one are attached to an $-R'-$ radical in the preceding $$-CY_2-R'-NCO$$

group.

The commercially available polyaryl methane polyisocyanates are mixtures of polyisocyanates of the above formula containing from about 20 to 60% by weight of the polyisocyanate where $n$ is 1 and the rest of the polyisocyanate are materials where $n$ is 2 to 3 or more with about 75 to 95% of the remainder being material having a value of $n$ equal to 2.

Although the commerical materials contain mixtures by distillation it is possible to prepare polyisocyanates essentially free of the material of the formula where $n$ is 1. The preferred range of values for $n$ is 2 to about 5 with at least a major percentage being the one where $n$ is 2 or more.

A preferred polyaryl methane polyisocyanate is the product obtained by the phosgenation of the primary polyamine obtained by reaction of aniline and formaldehyde which yields a product containing a major percentage of polyphenylene methane polyisocyanate.

While certain representative embodiments and details have been shown for the purpose of illustrating the invention, it will be apparent to those skilled in this art that various changes and modifications may be made therein without departing from the spirit or scope of the invention.

What is claimed is:

1. A storage stable prepolymer, which can be stored in a sealed container for up to six months and still be melted and is reactable with an organic diamine to produce a cured polymer, consisting essentially of the reaction product of a mol of a reactive hydrogen containing material of 500 to 6000 molecular weight selected from the class consisting of at least one polyester polyol, polyether polyol, hydrocarbon polyol and polycarbonate polyol, said polyol having from 2 to 8 hydroxyls, with 1.1 to 12 mols of a mix composed of about one to 35 parts of a mixture of organic polyisocyanates of the formula $$OCN—R—(CY_2—R'—NCO)_n$$

in which R and R' are arylene radicals, Y is selected from the class consisting of hydrogen, alkyl and arylene, $n$ is a whole number having values of from about one to about 10 and the $(CY_2—R'—NCO)$ groups in excess of one are attached to an —R'— radical in the preceding $$(CY_2—R'—NCO)$$

group, with the proviso that about 20 to 60 percent by weight of the polyisocyanate of the mixture have the structure where $n$ is one and the rest of the polyisocyanate have the structure where $n$ is at least two, for each 100 parts of toluidine diisocyanate.

References Cited
UNITED STATES PATENTS

| | | | |
|---|---|---|---|
| 2,683,730 | 7/1954 | Seeger et al. | 260—453 |
| 3,062,772 | 11/1962 | Keplinger et al. | 260—40 |
| 3,110,686 | 11/1963 | Newton | 260—2.5 |
| 3,341,463 | 9/1967 | Gemeinhardt | 252—182 |
| 3,248,373 | 4/1966 | Barringer | 260—77.5 |

DONALD E. CZAJA, Primary Examiner

M. I. MARQUIS, Assistant Examiner

U.S. Cl. X.R.

260—2.5 AT, 77.5 AT, 77.5 D